US011120561B2

(12) United States Patent
Andreopoulos et al.

(10) Patent No.: US 11,120,561 B2
(45) Date of Patent: Sep. 14, 2021

(54) DETECTION, TRACKING AND RECOGNITION ON NETWORKS OF DIGITAL NEUROSYNAPTIC CORES

(71) Applicant: INTERNATIONAL BUSINESS MACHINES CORPORATION, Armonk, NY (US)

(72) Inventors: Alexander Andreopoulos, San Jose, CA (US); Arnon Amir, San Jose, CA (US); Tapan K. Nayak, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 16/177,011

(22) Filed: Oct. 31, 2018

(65) Prior Publication Data

US 2020/0134843 A1 Apr. 30, 2020

(51) Int. Cl.
*G06T 7/246* (2017.01)
*G06N 3/04* (2006.01)
*G06K 9/62* (2006.01)

(52) U.S. Cl.
CPC ............ *G06T 7/251* (2017.01); *G06K 9/6267* (2013.01); *G06N 3/049* (2013.01); *G06N 3/0454* (2013.01); *G06N 3/0481* (2013.01); *G06T 2207/10016* (2013.01); *G06T 2207/20084* (2013.01)

(58) Field of Classification Search
CPC .......... G06T 7/251; G06T 2207/10016; G06T 2207/20084; G06K 9/6267; G06N 3/0454; G06N 3/0481; G06N 3/049
See application file for complete search history.

(56) References Cited

U.S. PATENT DOCUMENTS

| | | | |
|---|---|---|---|
| 9,342,759 B1* | 5/2016 | Chen | G06K 9/6262 |
| 9,576,214 B1 | 2/2017 | Zhang et al. | |
| 9,754,163 B2 | 9/2017 | Segalovitz et al. | |
| 2016/0086052 A1* | 3/2016 | Piekniewski | G06K 9/4671 382/103 |
| 2016/0232430 A1* | 8/2016 | Andreopoulos | G06N 3/08 |
| 2017/0083762 A1* | 3/2017 | Segalovitz | G06K 9/4628 |
| 2018/0189645 A1* | 7/2018 | Chen | G06N 3/0445 |

(Continued)

OTHER PUBLICATIONS

Anonymous, "Cascade Deep Learning Model Training for Visual Analytics," (2016).

(Continued)

*Primary Examiner* — Zhitong Chen

(74) *Attorney, Agent, or Firm* — Erik Huestis; Stephen Kenny; Foley Hoag, LLP

(57) ABSTRACT

Detection, tracking and recognition on networks of digital neurosynaptic cores are provided. In various embodiments, an image sensor is configured to provide a time-series of frames. A first artificial neural network is operatively coupled to the image sensor and configured to detect a plurality of objects in the time-series of frames. A second artificial neural network is operatively coupled to the first artificial neural network and configured to classify objects detected by the first neural network and output a location and classification of said classified objects. The first and second artificial neural networks comprise one or more spike-based neurosynaptic cores.

20 Claims, 17 Drawing Sheets

(56) References Cited

U.S. PATENT DOCUMENTS

2018/0243903 A1* 8/2018 Passot ................. G06N 3/08
2019/0156179 A1* 5/2019 Thiele ............... G06N 3/0454

OTHER PUBLICATIONS

Anonymous, "Finding fine-grained detector from trained deep learning models," (2017).
Anonymous, "Object Classfication Using Space-Frequency Domain Transform Coefficient Feature Vectors," (2002).
Guo et al., "Method and System for Salient Object Detection for In-Media Advertising," Yahoo! (2012).
Khan, "Biologically-Based Interactive Neural Network Models for Visual Attention and Object Recognition," Linkoping University Department of Computer Science and Information Science, Dissertations No. 1465 (2012).
Leitner et al., "Learning Visual Object Detection and Localisation Using icVision," BICA, 5:29-41 (2013).

* cited by examiner

DETECTION, TRACKING AND RECOGNITION ON NETWORKS OF DIGITAL NEUROSYNAPTIC CORES

This invention was made with Government support under FA8750-17-C-0097 awarded by USAF, AFMC Air Force Research Laboratory. The Government has certain rights in this invention.

BACKGROUND

Embodiments of the present disclosure relate to neuromorphic hardware, and more specifically, to detection, tracking and recognition on networks of digital neurosynaptic cores.

BRIEF SUMMARY

According to embodiments of the present disclosure, systems for detection, tracking and recognition on networks of digital neurosynaptic cores are provided. An image sensor is configured to provide a time-series of frames. A first artificial neural network is operatively coupled to the image sensor and configured to detect a plurality of objects in the time-series of frames. A second artificial neural network is operatively coupled to the first artificial neural network and configured to classify objects detected by the first neural network and output a location and classification of said classified objects. The first and second artificial neural networks comprise one or more spike-based neurosynaptic cores.

According to embodiments of the present disclosure, methods of and computer program products for detection, tracking and recognition on networks of digital neurosynaptic cores are provided. In various embodiments, a time-series of frames is received from an image sensor. A plurality of objects is detected in the time-series of frames by a first artificial neural network operatively coupled to the image sensor. Objects detected by the first neural network are classified by a second artificial neural network operatively coupled to the first artificial neural network. A location and classification of said classified objects is output by the second artificial neural network. The first and second artificial neural networks comprise one or more spike-based neurosynaptic cores.

DETAILED DESCRIPTION

Figure 1:
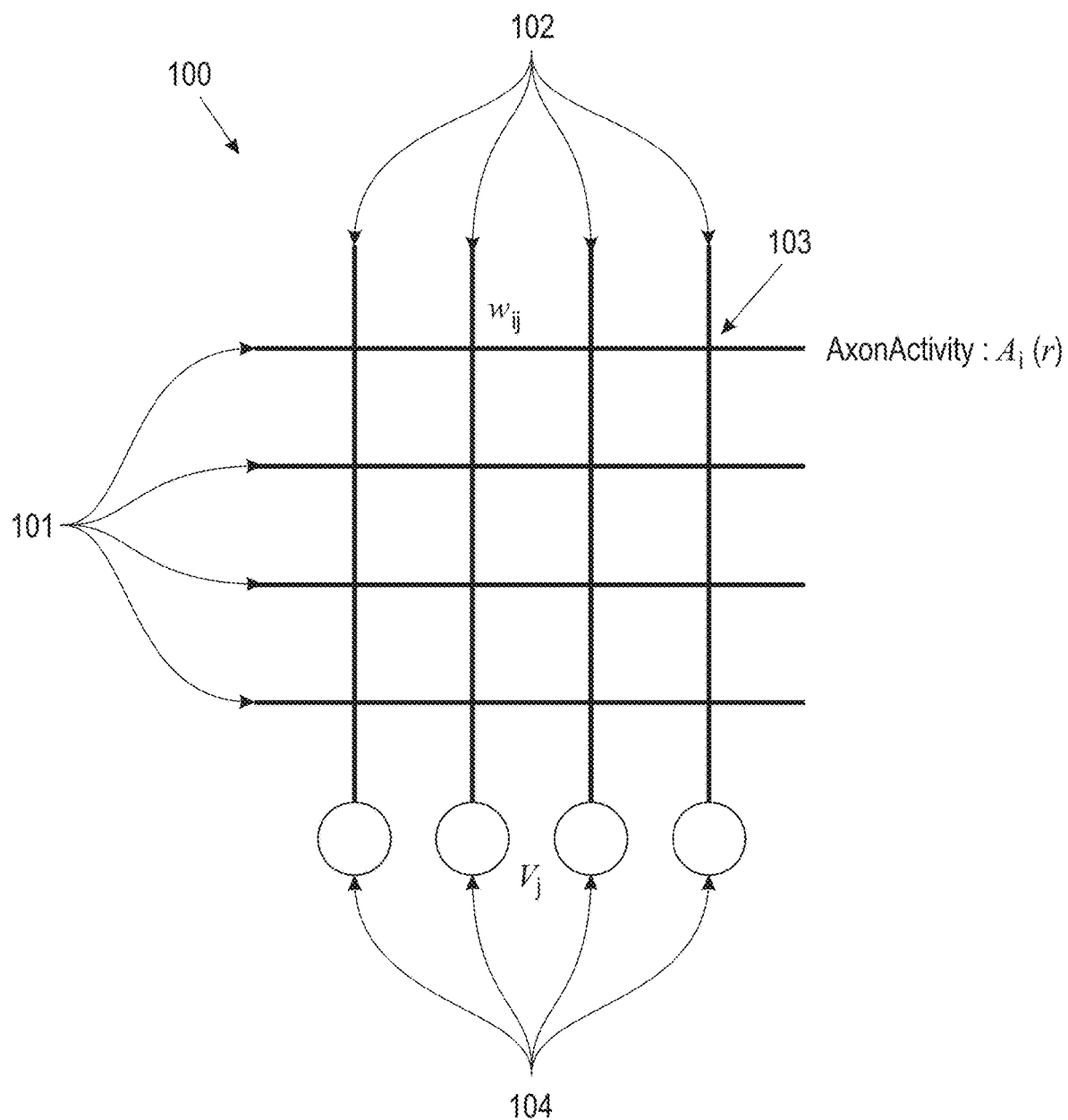
FIG. 1 depicts a neurosynaptic core according to embodiments of the present disclosure.

The ability to detect, track and recognize objects is a fundamental task in computer vision. There is a need to run such detection, tracking, and recognition systems on digital, low-power neurosynaptic core hardware. In particular, such an approach is useful for embedded systems and cognitive systems in general. Accordingly, the present disclosure provides core-based neuromorphic systems that detect, localize, and classify a plurality of objects in a scene and classifies each of them into one of several object classes or categories. It will be appreciated that although various examples are provided herein in terms of TrueNorth, the present disclosure is applicable to other neuromorphic hardware.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neuro synaptic cores, where each of the smaller networks, in turn, could be constructed by interconnecting a set of even smaller networks, and so on, down to a network consisting of a single neuro synaptic core, which is the fundamental non-divisible building block. This programming paradigm is referred to as Corelet Programming.

A neuromorphic classifier requires a high-resolution image patch of an object, and a large neural network to process it. Applying classifier networks simultaneously at all possible locations in a wide field of view frame would require a large neural network, consisting of a large number of neuromorphic cores, rendering it very expensive in terms of power and hardware resources.

Accordingly, various embodiments of the present disclosure combine a low-resolution, full-frame detection network with one or more high-resolution, patch classifier networks. First, the detection network provides the location of object(s) of interest. Then, a patch router is used to route this patch, in high resolution, to the classifier. The classifier classifies the object category and may provide finer details about it (e.g., size, color, bounding box, etc.).

Neither of the two networks, detector and classifier, can independently achieve the task of parsing a complex scene for scene understanding and providing detailed object information. While the detection network can process the entire scene, at low resolution, it cannot provide much details on any of the objects it finds—providing a low cost per location while only recognizing the presence of an object, or one or a few classes.

While the recognition network can provide detailed class information about the object, applying it to the entire input image would require large processing and power resources.

The present disclosure provides neuromorphic systems for object detection, tracking and recognition. These end-to-end systems are implemented in their entirety on neuromorphic, digital, core-based hardware. Various embodiments are capable of detecting and tracking simultaneously multiple moving targets. Through the use of a patch router, various embodiments route any detected object patches to one or more classifiers, simultaneously classifying objects in the detected patches. Each detected patch is then intelligently routed among a bank of classifiers.

End-to-end multi-object detection, recognition, and tracking systems according to the present disclosure are designed and implemented on neuromorphic, event-based digital cores and event-based sensor. Such implementations on neuromorphic hardware are fundamentally different from algorithms running on von-Neumann architectures such as CPUs. For example, there is no instruction set, no program, and no instruction sequence. Each neuron is configured once, and then repeats the same computation again and again. All cores in the system operate concurrently.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
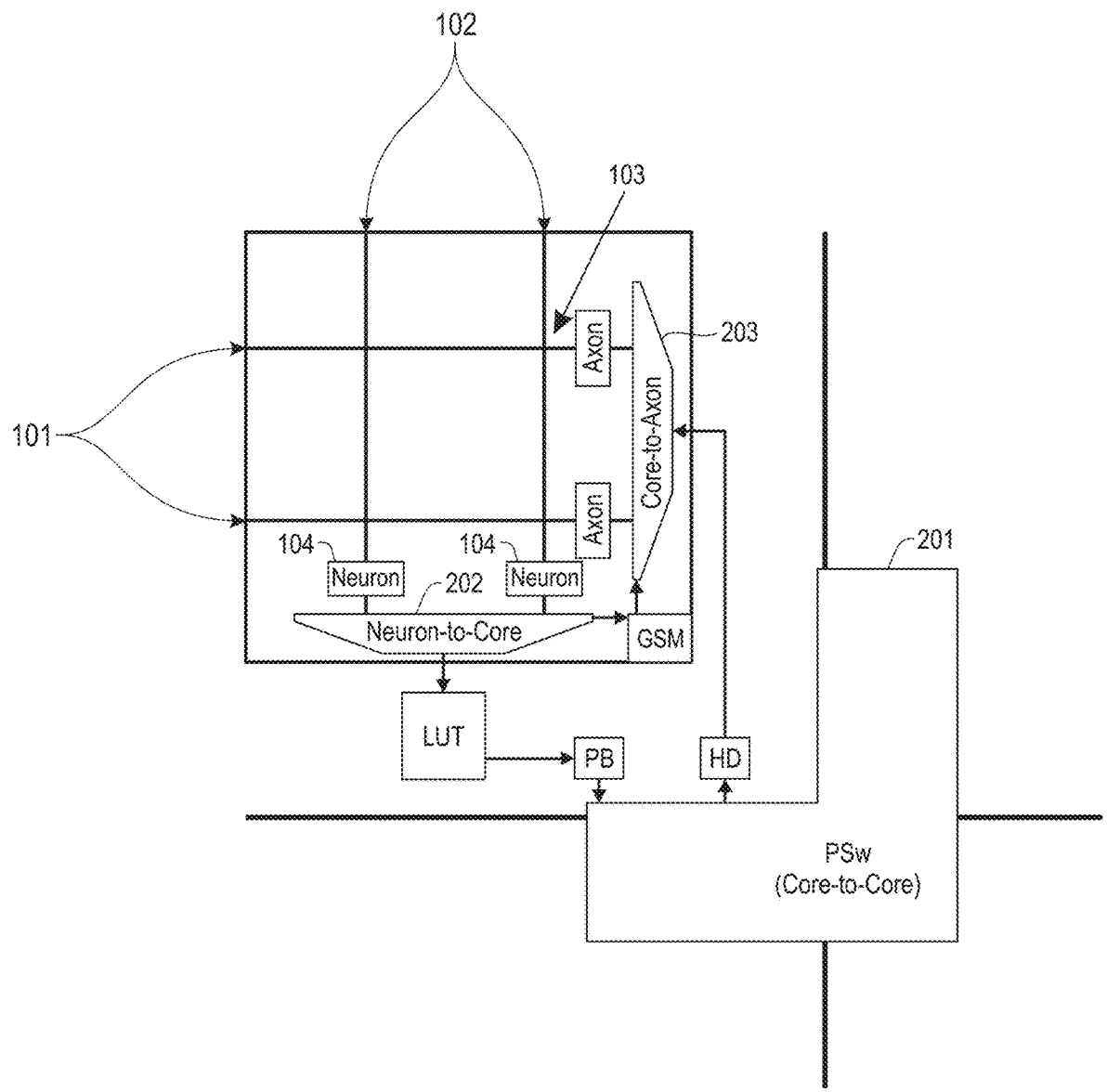
FIG. 2 depicts a neurosynaptic core and mesh router according to embodiments of the present disclosure.

In some embodiments a plurality of neurosynaptic cores are tiled on a chip. In an exemplary embodiment, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided.

Figure 3:
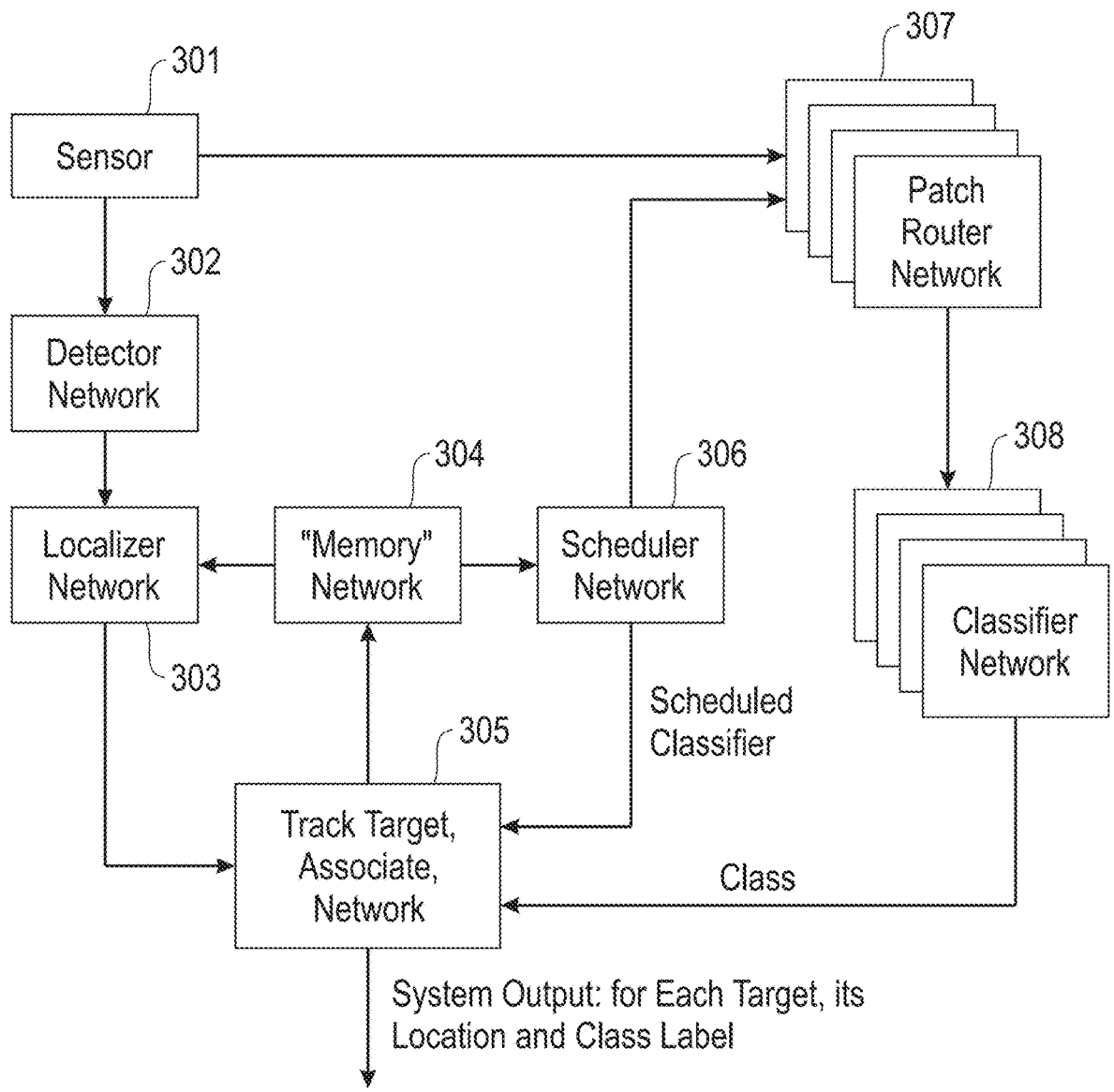
FIG. 3 is a schematic view of a system according to embodiments of the present disclosure.

Referring now to FIG. 3, a schematic view of a system according to the present disclosure is provided. Sensor 301 receives input from the environment, and provides spiking data. In various embodiments, sensor 301 comprises one or more spiking camera. Detector 302 receives input from sensor 301. Detector 302 comprises a neural network that computes a saliency map, composed of a grid of cells, where cells with higher activations denote locations where object(s) of interest are more likely to be found. Localizer 303 comprises a neural network that receives the saliency map from detector 302. In addition, localizer 303 receives previous object(s) location(s) stored in memory network 304 (if any). From these, localizer 303 determines the next most likely object location(s).

Tracker 305 receives object(s) location(s) information from localizer 303. Tracker 305 determines its bounding box, compares it with tracked object(s) and associates each current detection with either an existing object or a newly created object trace.

Memory 304 comprises a neural network that preserves the list of currently localized objects' coordinates Like a conventional memory, the data held by this network can be updated and/or probed. Memory 304 is updated based on the output of tracker 305. All localized object coordinates are provided to the recognition/classification network as set forth below.

Scheduler 306 comprises a neural network that determines which of the list of detected object locations (if any) to route to which patch classifier. In addition, scheduler 306 provides the scheduled classifier back to tracker 305.

Patch Router 307 comprises a neural network that receives an input image from sensor 301 and indices of location(s) via scheduler 306. Patch Router 307 then routes selected image patch(es) to classifier(s) 308. Classifier 308 comprises a neural network classifier that assigns a class label to the image patch presented at its input. The output class is provided back to tracker 305, which in turn provides the ID, location, and class of each detected object currently in the image.

The entire system (exclusive of sensor 101), is implemented in various embodiments as a core-based neural network on neuromorphic hardware. All components are combined into one large complex network, using the same configurable neuromorphic cores. In this way, all networks may run concurrently.

Figure 4:
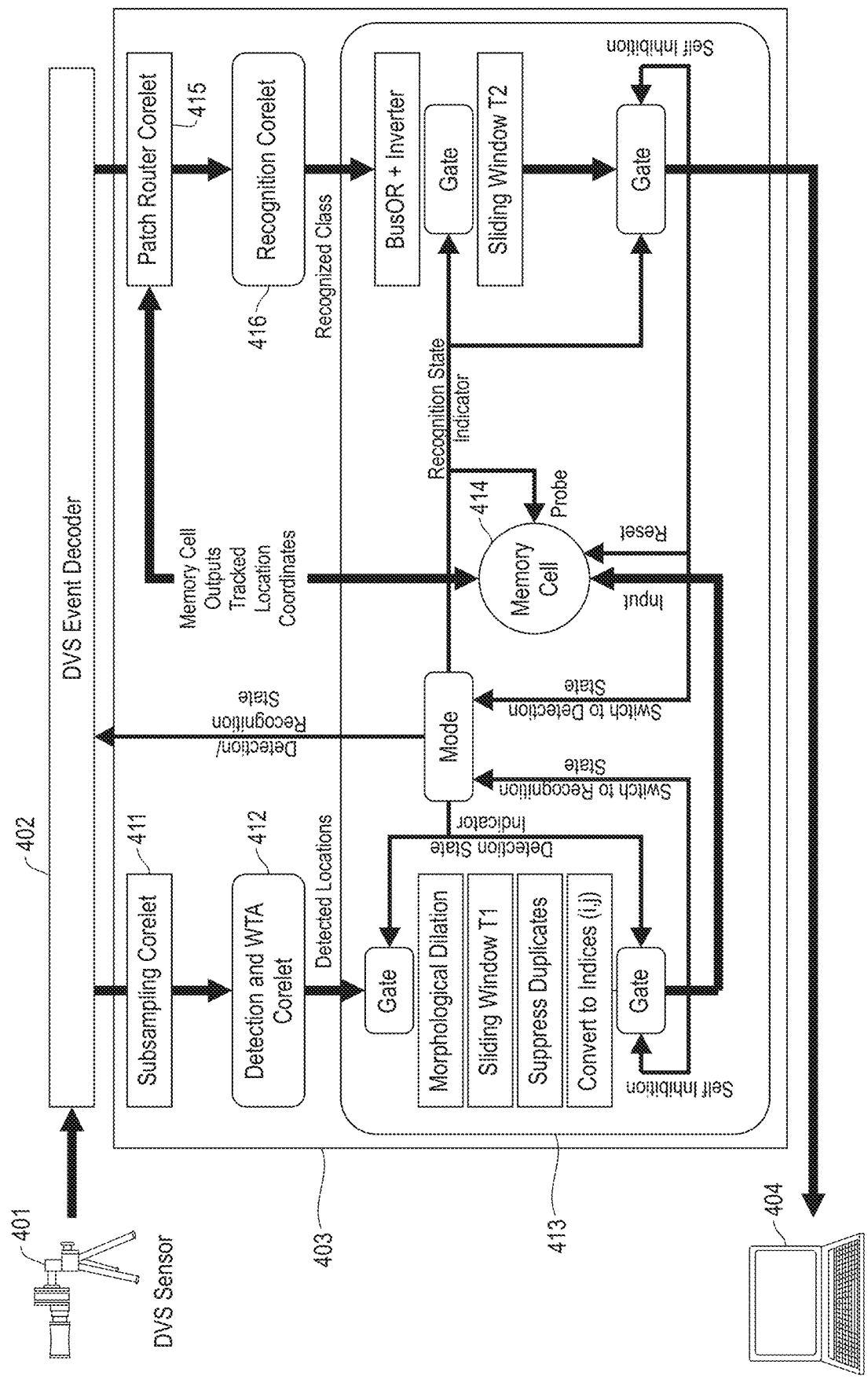
FIG. 4 illustrates an exemplary system for gesture recognition according to embodiments of the present disclosure.

Referring to FIG. 4, an exemplary system for gesture recognition is illustrated. Sensor 401, such as a DVS (Dynamic Vision Sensor) provides image data to event decoder 402. Event decoder 402 in turn provides input to neurosynaptic system 403. Neurosynaptic system 403 in turn performs the multi-object detection, recognition, and tracking, as set out above.

In particular, subsampling corelet 411 provides subsamples of input frames to detection and winner take all (WTA) corelet 412, which in turn provides detected locations to tracker corelet 413. In various embodiments, tracker corelet 413 applies morphological dilation and a sliding window to the input. Duplicates may be removed, and then the detected location is converted to indices. The indexed location is provided to memory 414.

Memory 414 outputs tracked location targets to patch router corelet 415, which in turn routes a given patch to recognition corelet 416. The recognized class from recognition corelet 416 is provided to tracker corelet 413. As pictured, the overall system toggles between a recognition and detection state.

In an exemplary embodiment, the system of FIG. 4 is applied to hand-gesture recognition, where fast response and hard real-time constraints are of the utmost importance for the user-experience. An exemplary system operates at 1000 classifications per second, with low latency and high accuracy, making it very responsive and robust. Operating on neurosynaptic cores as set out herein, it consumes very low power. Such systems are useful for, e.g., human-computer interaction applications, such as controlling a TV, for interaction with mobile devices, computer games, or cars. However, it will also be appreciated that systems as described herein may be applied to a variety of additional recognition and tracking problems in addition to gesture recognition.

Figure 5:
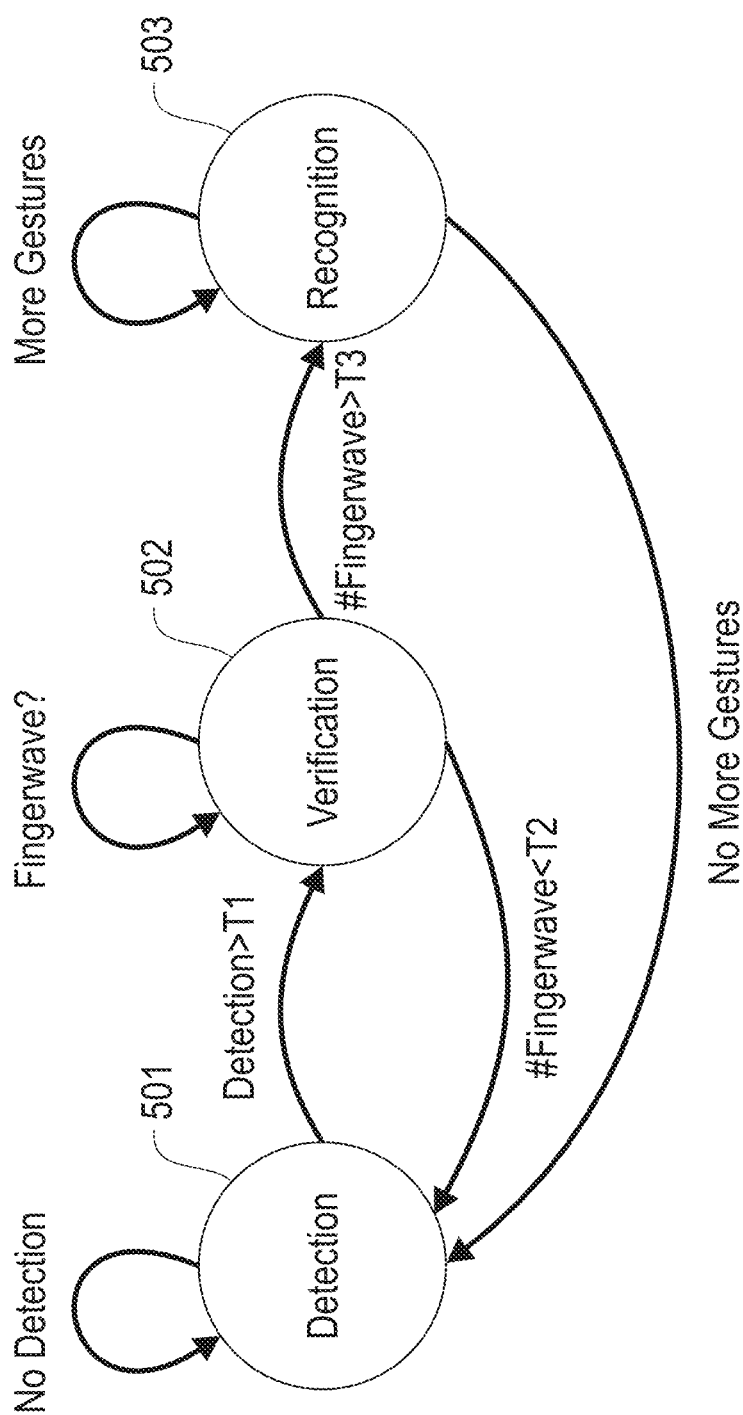
FIG. 5 is a finite state machine diagram for a tracker network including verification according to embodiments of the present disclosure.

Referring now to FIG. 5, a finite state machine diagram is provided for a tracker network including verification according to embodiments of the present disclosure. In this example, a verification state is included, in addition to the detection and classification state shown in prior example. Detection state 501 persists while there is no detection. When detection occurs, the system transitions to verification state 502. In this state, the detector routes the candidate detected patch to a more expensive verification module that decides if the detection was correct. If it was correct it permits the patch to be routed to the classifier, and the system enters recognition state 503. Otherwise, the patch is rejected and the system returns to detection state 501.

In this example, a verified fingerwave gesture advances the system to the recognition state 503, in which additional gestures may be recognized. In this way, the fingerwave gesture acts as an indicator to begin further detection. It will be appreciated that a variety of alternative gestures may be used in this way, and that in alternative embodiments a sound or word may instead be used to initial recognition.

In various embodiments, a sliding window filter (such as shown below in FIG. 13) can keep a count of the detections in the past N ticks (or, could be representing the count of detections in the past N frames). In such embodiments, when the system state in FIG. 5 is Verification, and number of Fingerwave detections within the sliding window is larger than T3, the network changes state from Verification to Recognition.

Figure 6:
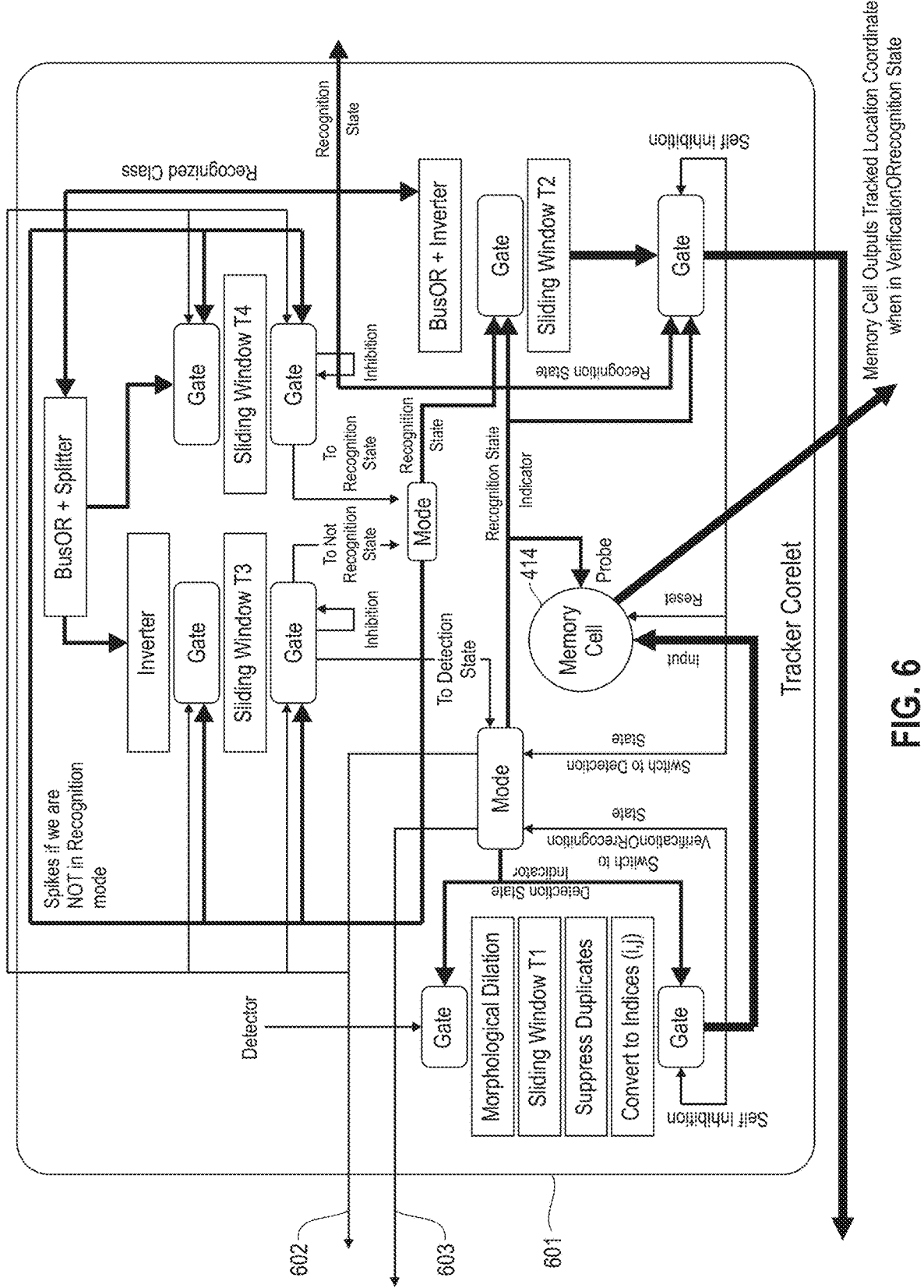
FIG. 6 depicts an exemplary tracker for gesture recognition with verification according to embodiments of the present disclosure.

Referring to FIG. 6, an exemplary tracker for gesture recognition with verification is illustrated. Tracker corelet 601 provides an alternative to tracker corelet 413 and includes the verification phase described in connection with FIG. 5. To accommodate this additional mode, tracker 601 provides a spike 602 if in verification or recognition mode, which causes patches to be routed to the classifier. Tracker 601 provides a spike 603 if in detection mode.

The performance of various exemplary embodiments of the system described above is summarized in Table 1. Example 1 provides a baseline implementation without a verification step. Example 2 reflects improved training of the detection classifier and the application of a 2×3 spatial filter on the detection heat map. Example 3 includes a ~25% longer end-of-gestures sliding window (SW) and a higher threshold, ~6% lower detection SW threshold, ~33% higher classifier SW, and an updated detector. Example 4 adds a 2×3 spatial filter on the detection heat map to Example 3. Example 5 adds a 3×3 '+' shaped spatial filter on detection heat map to Example 3. Example 6 uses a weighted 3×3 spatial filter instead of '+' filter, and is otherwise the same as Example 5. Example 7 adds the extra verification step between detection and recognition with location offsets.

TABLE 1

| Example | Finger-wave Detection & Localization | | | Gesture Recognition | | | Tracking | |
|---|---|---|---|---|---|---|---|---|
| | Detection Rate | False Detection Rate | Detection Latency (mSec) | Percent Gestures Detected | Accuracy Per tick | Accuracy Per gesture | Localization Error (Ex, Ey) | Early Break |
| 1 | 0.868 | 1.06E−05 | 419 | 0.793 | 0.720 | 0.921 | (3, 14) | 0.229 |
| 2 | 0.947 | 2.17E−05 | 266 | 0.797 | 0.719 | 0.922 | (10, 5) | 0.363 |
| 3 | 0.851 | 9.20E−06 | 539 | 0.830 | 0.807 | 0.956 | (3, 8) | 0.103 |
| 4 | 0.956 | 4.10E−05 | 251 | 0.875 | 0.751 | 0.911 | (10, 5) | 0.221 |
| 5 | 0.860 | 9.20E−06 | 467 | 0.826 | 0.800 | 0.947 | (4, 9) | 0.095 |
| 6 | 0.930 | 1.08E−05 | 317 | 0.902 | 0.798 | 0.948 | (4, 8) | 0.090 |
| 7 | 0.939 | 0 | 558 | 0.928 | 0.832 | 0.957 | (5, 5) | 0.065 |

Figure 7:
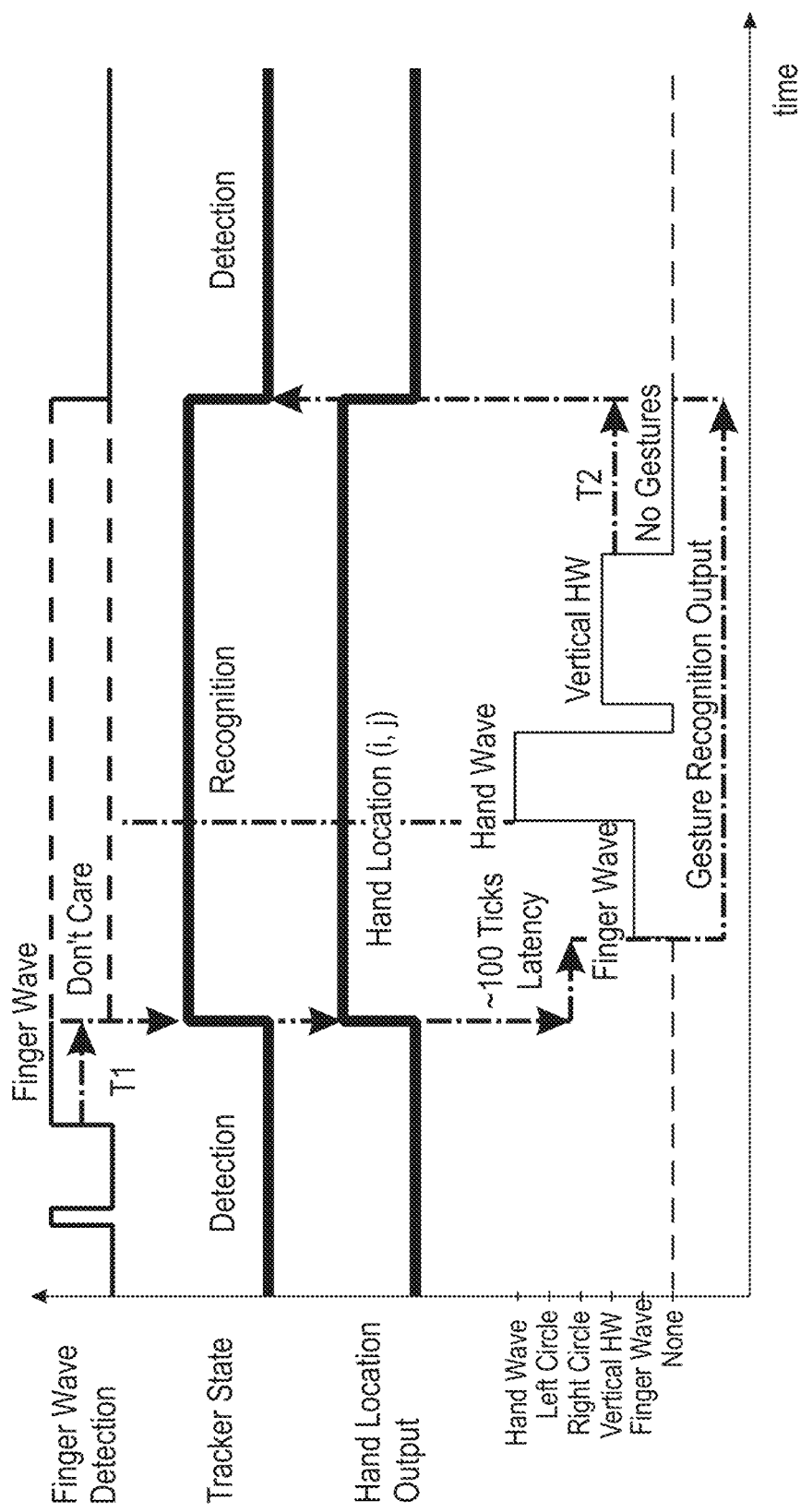
FIG. 7 is a time diagram for a tracker according to embodiments of the present disclosure.

Referring to FIG. 7, a time diagram is provided for a tracker as described above. T1 and T2 are programmable periods of a sliding-window filter corelet. From left to right, the detection of a hand wave places the tracker in the recognition state from the detection state. During the recognition state, the hand location is output. Individual gestures are likewise detected until no gestures appear for a period of time.

An integrated controller network is used to control the concurrent application of the detector to determine the location of an object/event of interest (e.g., a finger-wave gesture to attend to) followed by the application of the recognition network around the attended/fixated region of interest (the hand region). Once there are no more events of interest (recognizable gestures) occurring in the area of interest, it stops routing the image patch to the recognition network and enables new detection to take place (switches back to the detection state).

The transition by the tracker between the detection and recognition states according to various embodiments is illustrated in pseudocode in Inset 1.

be probed at most once every two ticks. The demultiplexer ensures that the memory cells can be probed at 1000 Hz. A spike along the reset axon sets the memory cell to empty in preparation for the next input.

Figure 8:
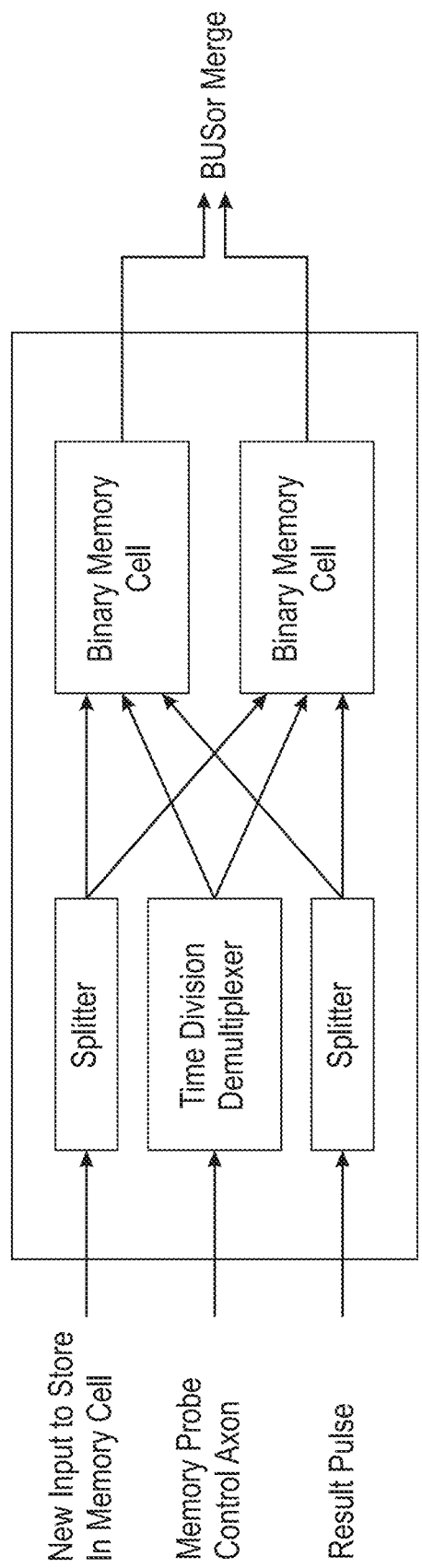
FIG. 8 illustrates an exemplary memory cell corelet according to embodiments of the present disclosure.
Figure 9:
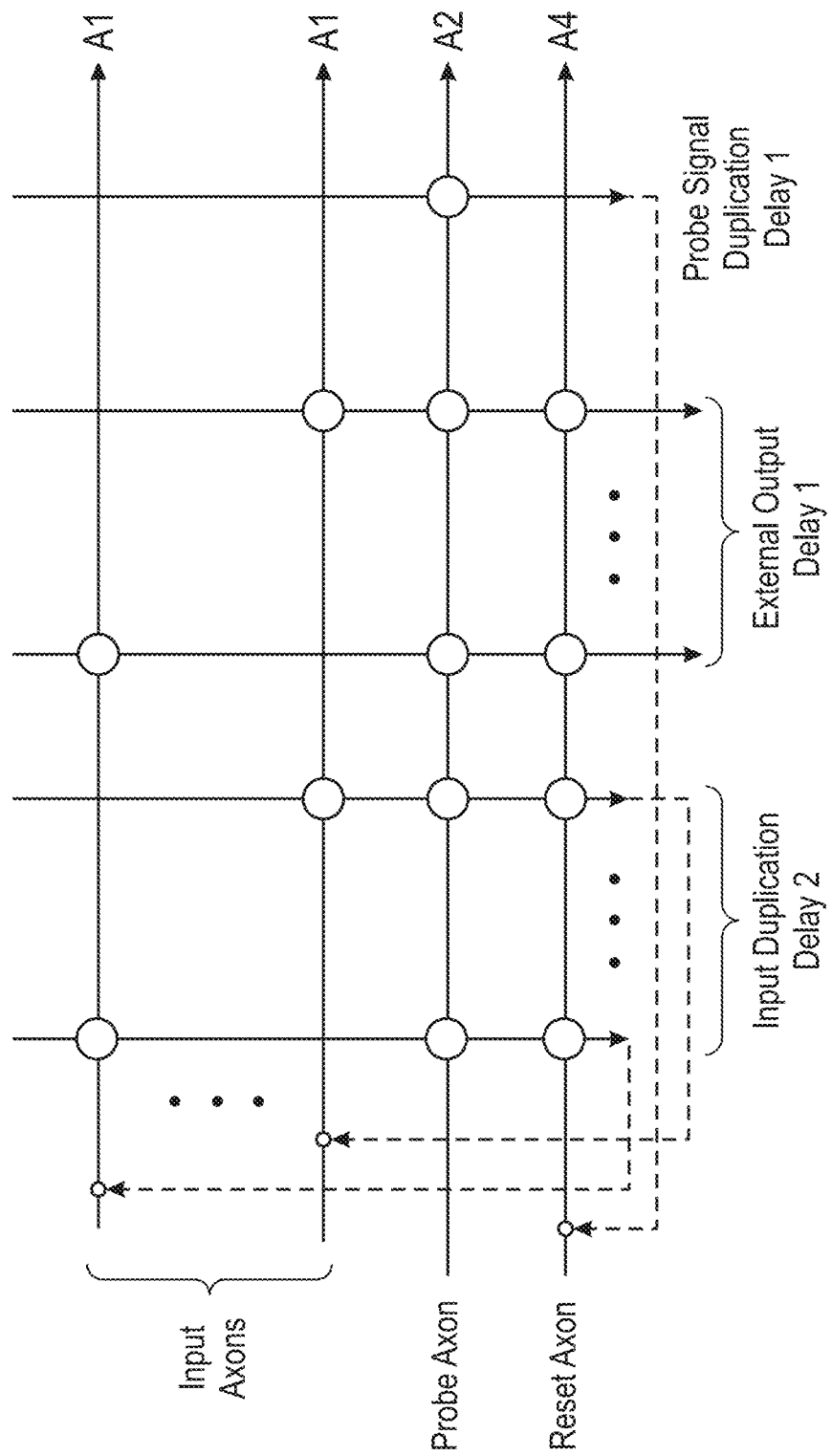
FIG. 9 illustrates an exemplary binary memory cell according to embodiments of the present disclosure.

Referring to FIG. 9, an exemplary binary memory cell is illustrated according to embodiments of the present disclosure. The binary memory cell of FIG. 9 may be used as the corresponding element of FIG. 8.

Figure 10:
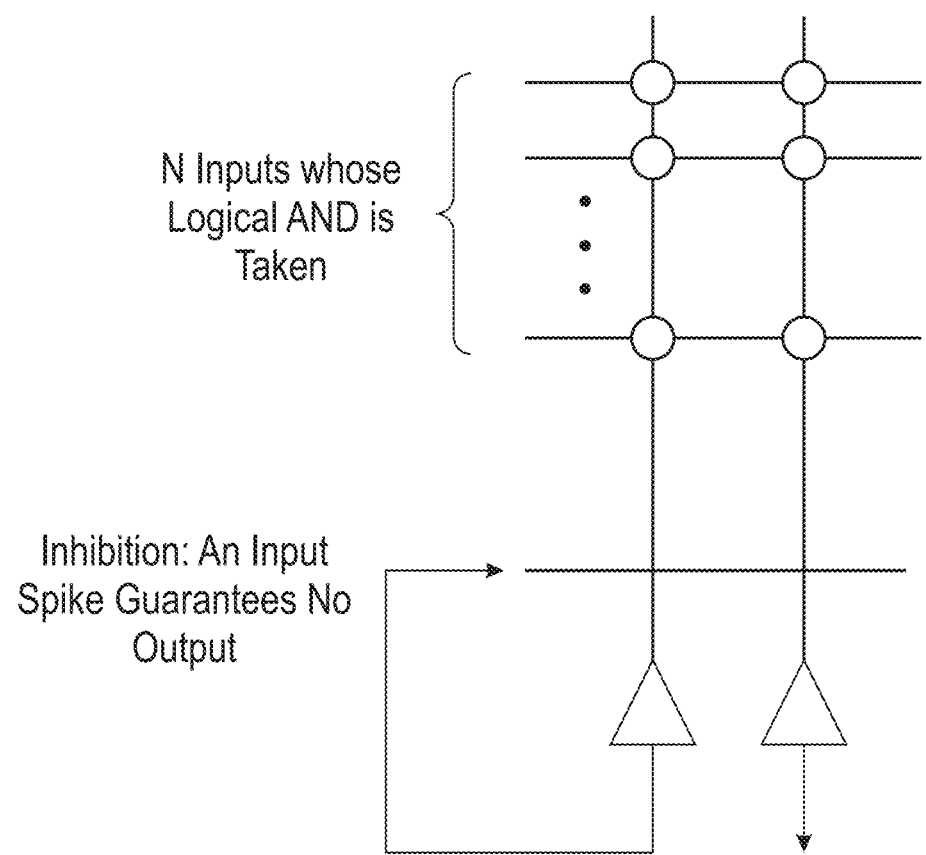
FIG. 10 illustrates an exemplary gate corelet with self-inhibition according to embodiments of the present disclosure.

Referring to FIG. 10, an exemplary gate corelet with self-inhibition is illustrated according to embodiments of the present disclosure. The gating corelet implements an AND gate with at least two inputs. It satisfies the requirement of self-inhibition so that if it spikes in a certain tick it does not spike again in the subsequent tick. The self-inhibition is achieved by sending a copy of its output recurrently back to itself in an inhibitory axon which guarantees that no spike will exit the corelet in the next tick.

Figure 11:
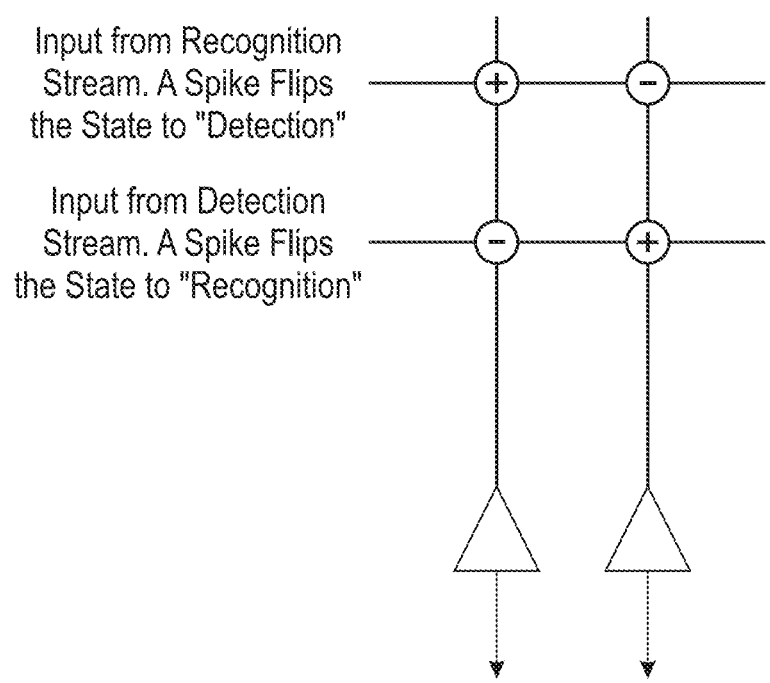
FIG. 11 illustrates an exemplary mode/binary state corelet according to embodiments of the present disclosure.

Referring to FIG. 11, an exemplary mode/binary state corelet is illustrated according to embodiments of the present disclosure. The Mode/Binary State corelet has two outputs denoting the current state (e.g., detection vs recog-

```
 1. currentState ← "Detection"
 2. if detection occurred at pixel (i,j) for N of the last T ticks & currentState=="Detection"
 3.     currentState ← "Recognition" and unblock sliding window of Recognizer
 4.     store in memory winning (i,j) coordinate of hand location
 5.     start blocking detector's sliding window
 6. end
 7. if currentState=="Recognition"
 8.     if none of the gesture classes recognized for N of the last T ticks
 9.         currentState ← "Detection"
10.         block recognition's sliding window & unblock detector's sliding window
11.         reset the memory cell to zero
12.     end
13.     if currentState=="Recognition"
14.         send current (i,j) coordinate to external output
15.         send current (i,j) to recognizer
16.         send current class to external output
17.     end
18. end
19. send currentState value to external output
20. GOTO 2
```
Inset 1

Referring to FIG. 8, an exemplary memory cell corelet is illustrated according to embodiments of the present disclosure. In various embodiments, the memory cell corelet includes an input axon, a probe axon, a reset axon, and an output. It stores the coordinate of the current detected gesture location. The input axon sets the memory to the desired value. A spike along the probe axon results in releasing the memory contents. Probe spikes can enter at every tick, so the memory cell can be queried at 1000 Hz on TrueNorth. For comparison, a binary memory cell alone can nition). If a particular output spikes at a particular tick it means that the system is in that state in the corresponding tick. It has two input control axons. One input axon flips the state to detection if currently in recognition state, and the other flips the state to recognition if currently in detection state.

Figure 12:
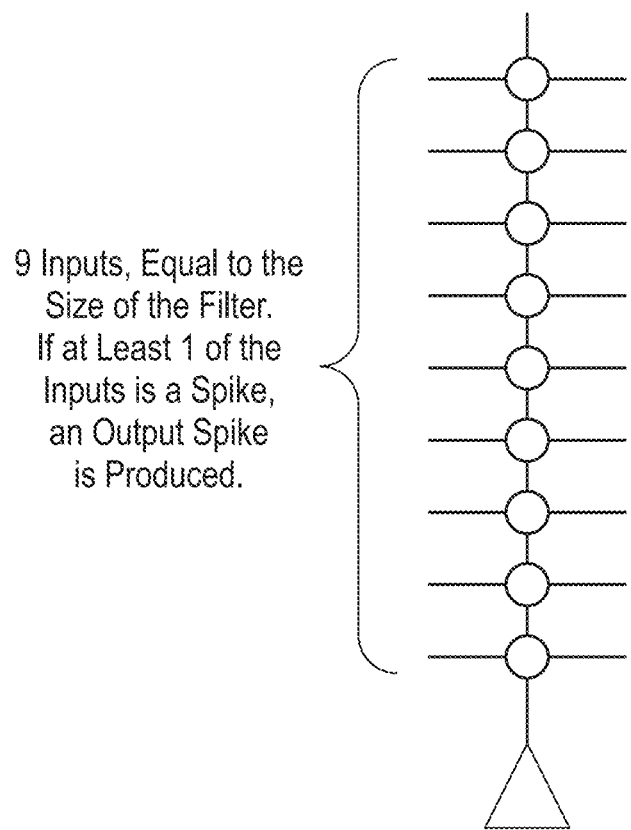
FIG. 12 illustrates an exemplary morphological dilation corelet according to embodiments of the present disclosure.

Referring to FIG. 12, an exemplary morphological dilation corelet is illustrated according to embodiments of the present disclosure. In this example, a 3×3 filter is convolved with the input image. The output of the convolution is 1 if the result of the convolution is at least 1. Otherwise the output is 0. At each tick, the corelet applies a morphological dilation operator, where the user can specify the filter/structuring element. In other words, if any pixel inside the structuring element has a spike in a given tick, then the output pixel corresponding to the center of the structuring element also produces a spike. This helps with smoothing winner locations so that neighboring pixels of a given winner are also assigned some weight of importance resulting in a smoother sliding window result.

Figure 13:
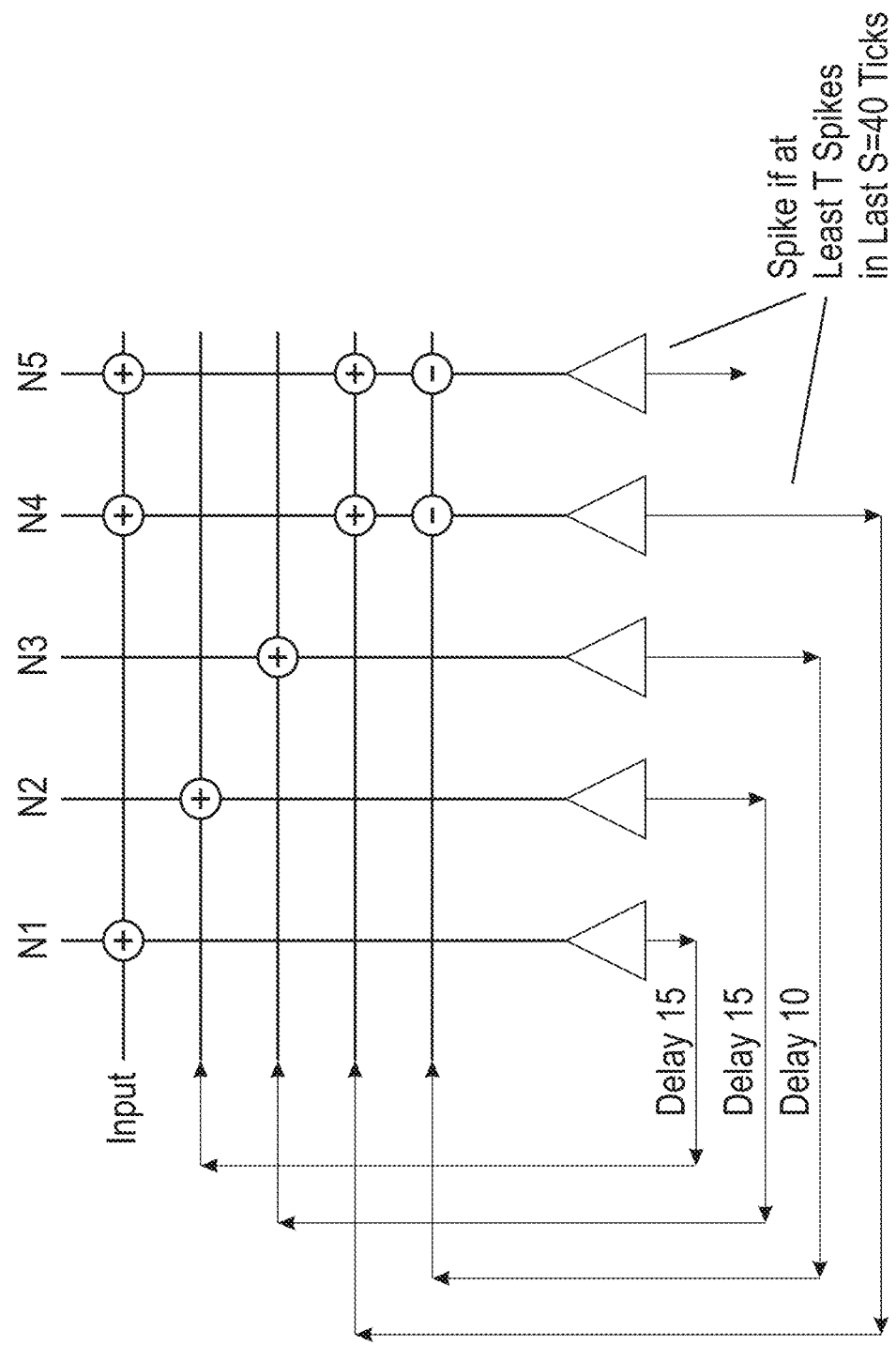
FIG. 13 illustrates an exemplary sliding window corelet according to embodiments of the present disclosure.

Referring to FIG. 13, an exemplary sliding window corelet is illustrated according to embodiments of the present disclosure. The user specifies the size S of the window and its threshold T. At each tick, if there were at least T input spikes during the previous S ticks, the sliding window produces an output spike. In the detection stream, this provides a voting mechanism accumulating detection votes from the recent past to detect the most likely location of the finger-wave gesture. On the recognition stream this is used to decide if there has not been a sufficient number of gestures occurring during the last few ticks, indicating a switch back to detection mode.

In the example pictured, a window size of 40 is assumed. Each time an input spike arrives, neurons N4,N5 are incremented. Each time neurons N4,N5 spike since reaching the threshold T, their membrane potential is decreased, so neuron N4 sends that spike recurrently back to N4,N5 to increase the potential by 1. Neurons N1,N2,N3 encode a delay of 40 for each input spike, and after 40 ticks that spike decrements the potential of N4,N5 since the spike is outside the S=40 window.

Figure 14:
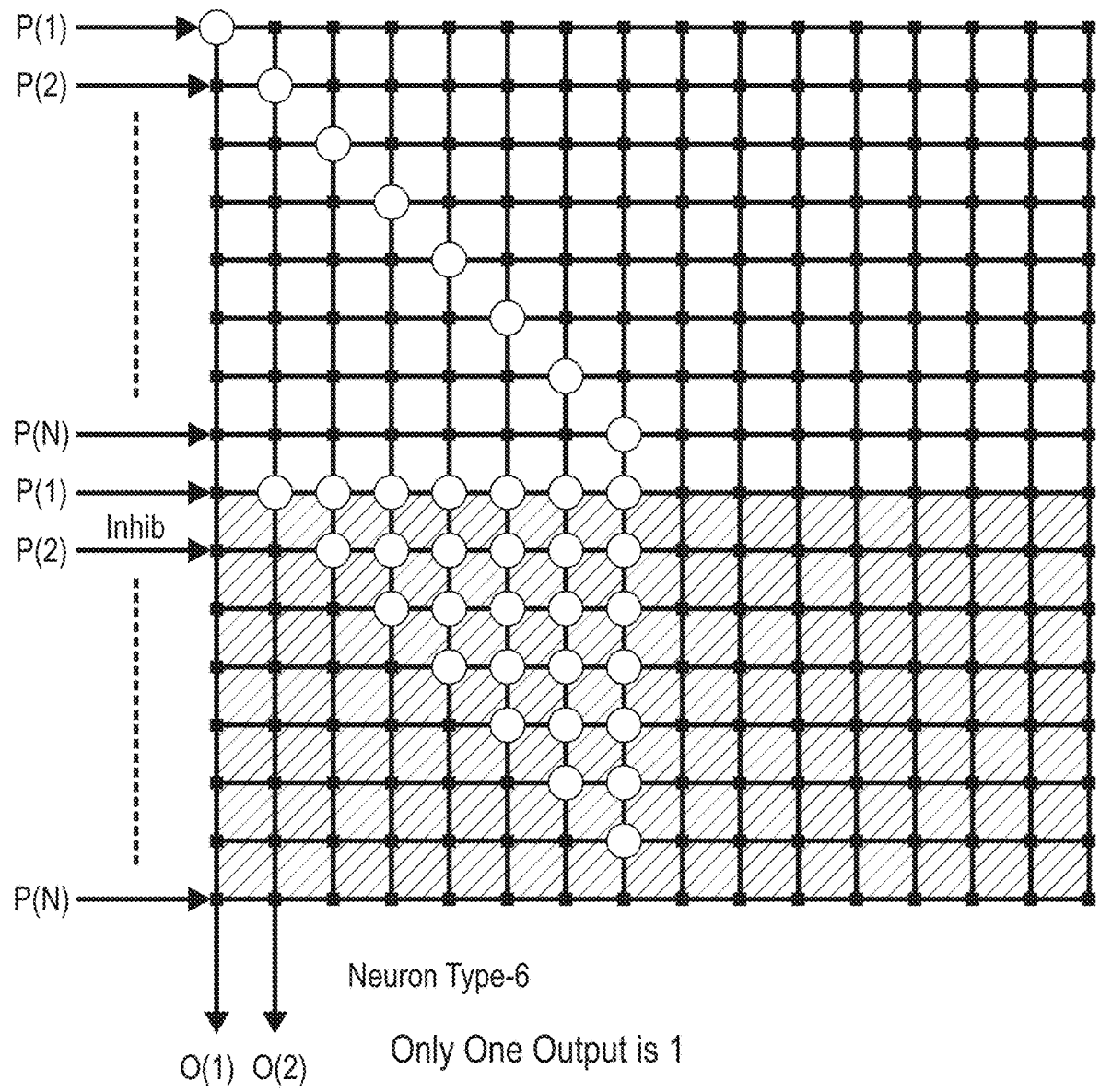
FIG. 14 illustrates an exemplary duplicate suppression corelet according to embodiments of the present disclosure.

Referring to FIG. 14, an exemplary duplicate suppression corelet is illustrated according to embodiments of the present disclosure. The duplicate suppression corelet suppresses in the detection stream all but one of the pixels which spike at a particular tick. It can be used to guarantee at most one location is chosen for the next fixation location. It includes a ranking component to assign a rank to each input pixel and ends up not suppressing the active input with the highest rank. By subtracting the OR of all previous indices, the first active index is selected, and is the only active output.

A thermometer to index converter is included in various embodiments. The converter takes as input a thermometer code and produces an index code as output, where the index is a single spike denoting the highest location where a spike occurred. This enables encoding the (i,j) coordinates of the current winner using just two spikes, making the code extremely compact. An exemplary corelet implementation uses the same approach as for suppressing duplicate spikes. It determines the last axon in the input thermometer code where there is a spike.

Figure 15:
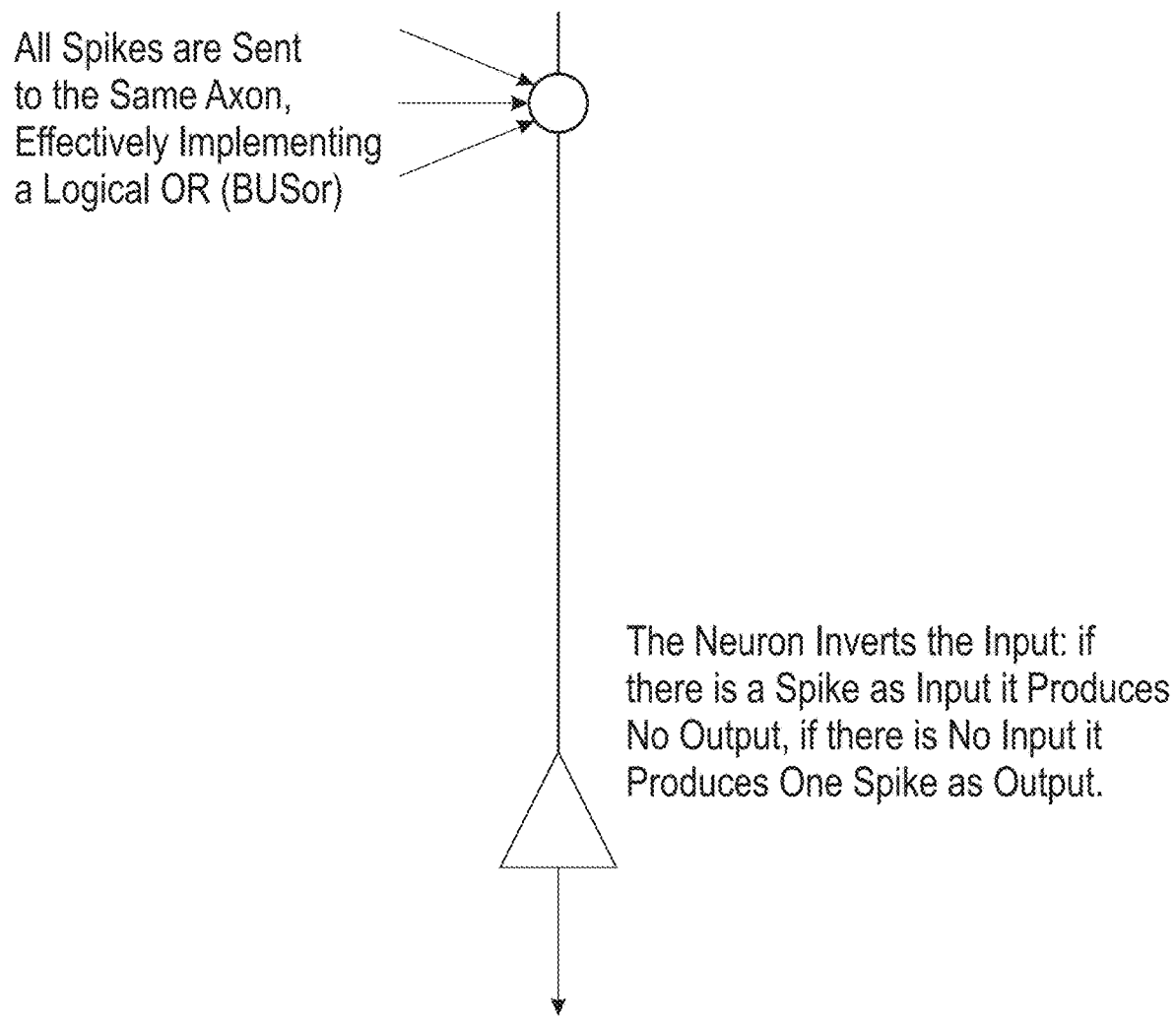
FIG. 15 illustrates an exemplary BusOR Inverter corelet according to embodiments of the present disclosure.

Referring to FIG. 15, an exemplary BusOR Inverter corelet is illustrated according to embodiments of the present disclosure. A BusOR of a user-specified subset of the classifier output is taken, and the output of the logical OR operation is inverted (a NOR gate). When this corelet produces a spike, it implies that during the current tick no gestures were recognized. The sliding window takes this output and produces an output spike if the system has not detected a gesture for a sufficient amount of time.

Figure 16:
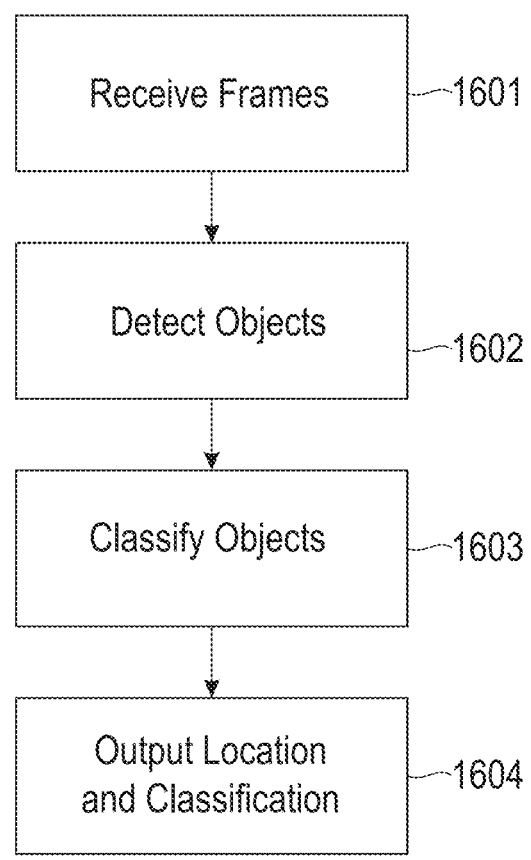
FIG. 16 illustrates a method of gesture detection according to embodiments of the present disclosure.

Referring to FIG. 16, a method of gesture detection is illustrated according to embodiments of the present disclosure. At 1601, a time-series of frames is received from an image sensor. At 1602, a plurality of objects is detected in the time-series of frames by a first artificial neural network operatively coupled to the image sensor. At 1603, objects detected by the first neural network are classified by a second artificial neural network operatively coupled to the first artificial neural network. At 1604, a location and classification of said classified objects is output by the second artificial neural network. The first and second artificial neural networks comprise one or more spike-based neurosynaptic cores.

Figure 17:
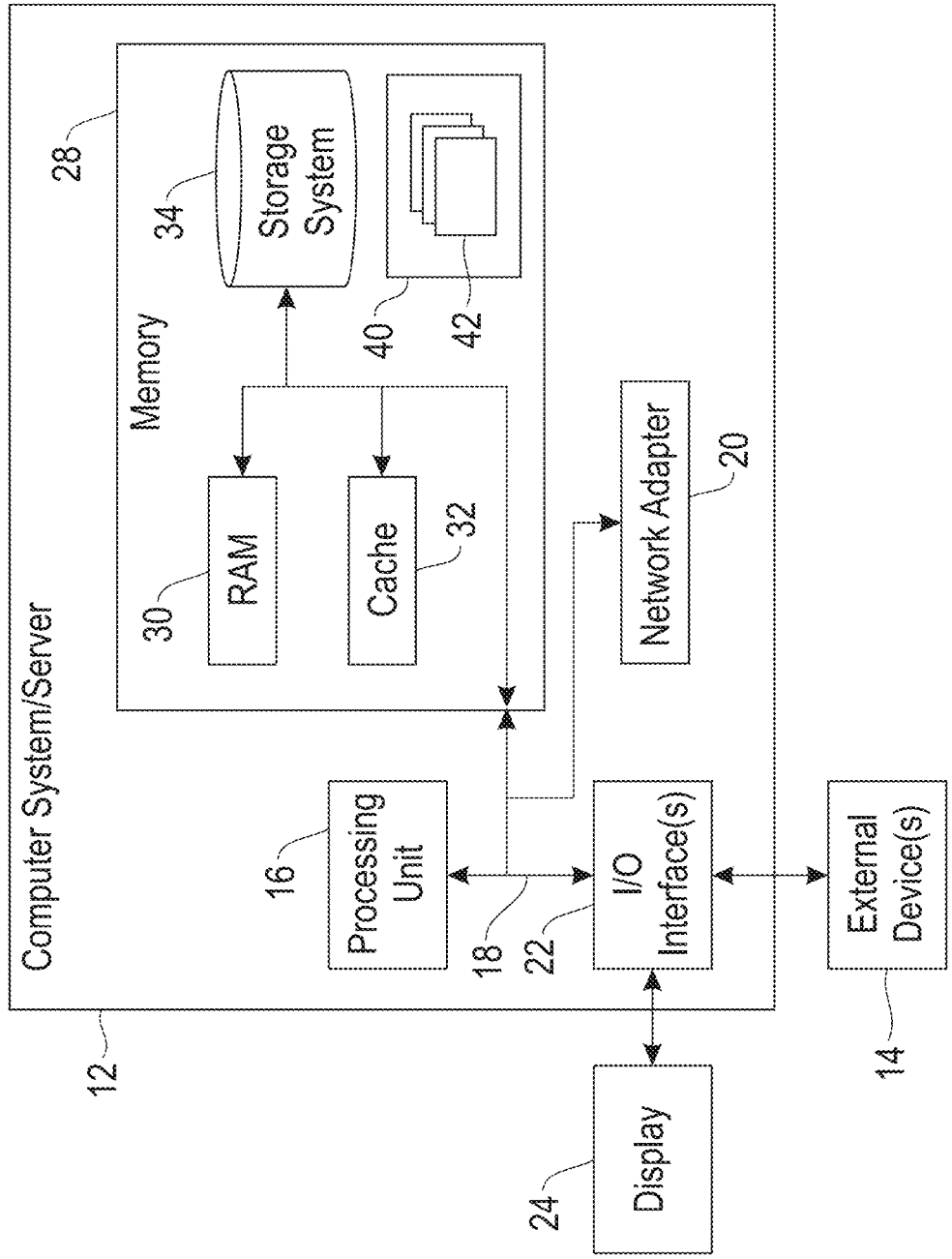
FIG. 17 depicts a computing node according to an embodiment of the present disclosure.

Referring now to FIG. 17, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
an image sensor configured to provide a time-series of frames;
a first artificial neural network operatively coupled to the image sensor and configured to detect a plurality of objects in the time-series of frames and output locations of the plurality of objects;
a scheduler operatively coupled to the image sensor and configured to provide indices of the locations of the plurality of objects;
a router operatively coupled to the image sensor and configured to
receive the indices of the locations of the plurality of objects from the scheduler, and
provide a patch of the time series of frames for each location of the plurality of objects;
a second artificial neural network operatively coupled to the router and configured to
receive the patch for each of the plurality of objects,
classify objects detected by the first neural network within each patch and
output a classification of said classified objects,
wherein the first and second artificial neural networks comprise one or more spike-based neurosynaptic cores.

2. The system of claim 1, wherein detecting the plurality of objects by the first neural network comprises:
generating a saliency map of each of the time series of frames.

3. The system of claim 2, wherein detecting the plurality of objects by the first neural network further comprises:
applying a winner take all unit to the saliency map.

4. The system of claim 2, wherein detecting the plurality of objects by the first neural network further comprises:
applying a local winner take all unit to a subset of the saliency map.

5. The system of claim 1, further comprising:
a third artificial neural network operatively coupled to the first and second artificial neural network and configured to
track each classified object in the time-series of frames,
wherein the third artificial neural networks comprise one or more spike-based neurosynaptic cores.

6. The system of claim 5, further comprising:
a memory cell operatively coupled to the third neural network and configured to receive and store each classified object.

7. The system of claim 6, wherein:
the scheduler is operatively coupled to the memory cell.

8. The system of claim 6 wherein the memory cell comprises an artificial neural network.

9. The system of claim 1, further comprising:
a fourth artificial neural network operatively coupled to the first neural network and configured to accept or reject the detection of the first neural network,
wherein the fourth artificial neural networks comprise one or more spike-based neurosynaptic cores.

10. The system of claim 1, wherein the scheduler comprises an artificial neural network.

11. The system of claim 1, further comprising:
a third artificial neural network operatively coupled to the first and second artificial neural network and configured to
receive a candidate detection location from the first artificial neural network;
apply the second artificial neural network to obtain a classification at the candidate detection location;
approve the candidate detection location when the classification of the second artificial neural network supports the candidate location,
wherein the third artificial neural networks comprise one or more spike-based neurosynaptic cores.

12. The system of claim 11, wherein the second artificial neural network is applied over a plurality of frames in the time-series.

13. The system of claim 1, further comprising:
at least one additional detection artificial neural network operatively coupled to the image sensor and configured to
detect a plurality of objects in the time-series of frames;
wherein the first artificial neural network and the at least one additional detection artificial neural network are configured to perform detection at multiple locations in the time-series of frames simultaneously.

14. The system of claim 13, further comprising:
at least one additional classification artificial neural network operatively coupled to the first artificial neural network or the at least one additional detection artificial neural network and configured to
classify objects detected by the first neural network or the at least one additional detection artificial neural network and
output a location and classification of said classified objects;
wherein the second artificial neural network and the at least one additional classification artificial neural network are configured to perform classification at multiple locations simultaneously.

15. A method comprising:
receiving a time-series of frames from an image sensor;
detecting a plurality of objects in the time-series of frames, and outputting locations of the plurality of objects, by a first artificial neural network operatively coupled to the image sensor;
providing indices of the locations of the plurality of objects by a scheduler;
receiving the indices of the locations of the plurality of objects from the scheduler and providing a patch of the time series of frames for each location of the plurality of objects to a second artificial neural network;
classifying objects detected by the first neural network within each patch by a second artificial neural network; and
outputting a classification of said classified objects by the second artificial neural network,
wherein the first and second artificial neural networks comprise one or more spike-based neurosynaptic cores.

16. The method of claim 15, wherein detecting the plurality of objects by the first neural network comprises:
generating a saliency map of each of the time series of frames.

17. The method of claim 16, wherein detecting the plurality of objects by the first neural network further comprises:
applying a winner take all unit to the saliency map.

18. The method of claim 16, wherein detecting the plurality of objects by the first neural network further comprises:
applying a local winner take all unit to a subset of the saliency map.

19. The method of claim 15, further comprising:
performing detection at multiple locations in the time-series of frames simultaneously by the first artificial neural network and at least one additional detection artificial neural network operatively coupled to the image sensor.

20. The method of claim 19, further comprising:
performing classification at multiple locations simultaneously by the second artificial neural network and at least one additional classification artificial neural network operatively coupled to the first artificial neural network or the at least one additional detection artificial neural network.

* * * * *